United States Patent [19]

Shen

[11] 4,456,222
[45] Jun. 26, 1984

[54] MECHANISM FOR WATER VALVE

[76] Inventor: Chung-Shan Shen, No. 34, Ho-Ping Rd., Hu Wei, Yunlin Hsien, Taiwan

[21] Appl. No.: 473,056

[22] Filed: Mar. 7, 1983

[51] Int. Cl.³ .............................................. F16K 31/52
[52] U.S. Cl. .................................... 251/230; 137/801; 251/339; 285/8
[58] Field of Search ........................ 251/230, 339, 349; 285/8; 137/624.11, 624.13, DIG. 2, 801

[56] References Cited

U.S. PATENT DOCUMENTS

| 1,724,131 | 8/1929 | Gavaza | 285/8 |
| 2,578,933 | 12/1951 | Hunter et al. | 285/8 |
| 3,220,695 | 11/1965 | Downey et al. | 251/230 |
| 3,333,815 | 8/1967 | Downey et al. | 251/230 |
| 4,067,358 | 1/1978 | Streich | 137/624.13 |
| 4,116,216 | 9/1978 | Rosenberg | 137/624.13 |
| 4,147,181 | 4/1979 | Hashimoto | 251/339 |

FOREIGN PATENT DOCUMENTS

| 11368 | 2/1934 | Australia | 251/349 |
| 1117943 | 6/1968 | United Kingdom | 285/8 |
| 1180676 | 2/1970 | United Kingdom | 251/339 |

Primary Examiner—George L. Walton
Attorney, Agent, or Firm—Tak Ki Sung

[57] ABSTRACT

A water faucet adapted to be connected to a water supply pipe comprising a soft elastic sleeve having on the inner wall thereof an upper flanged ring and a lower flanged ring which functions as a valve seat; a ball placed within the sleeve for remotely blocking the valve seat; a clamping tube disposed between a retainer ring and the sleeve; a drain pipe connected to the lower section of the clamping tube having therein a cover block comprising a cylindrical body portion and a perforated upper end plate, the interior surface of the drain pipe and cover block being provided with projections and guide teeth; and an operating lever in the form of a cylinder having its upper end extending through the cover block and the lower end extending out of the drain pipe, a rotating tube being attached to the intermediate section of the cylinder, the rotating tube having blocks provided on its circumference which are guided by the projections and guide teeth to maintain the operating lever in a raised or lowered position so as to open or close the faucet.

5 Claims, 7 Drawing Figures

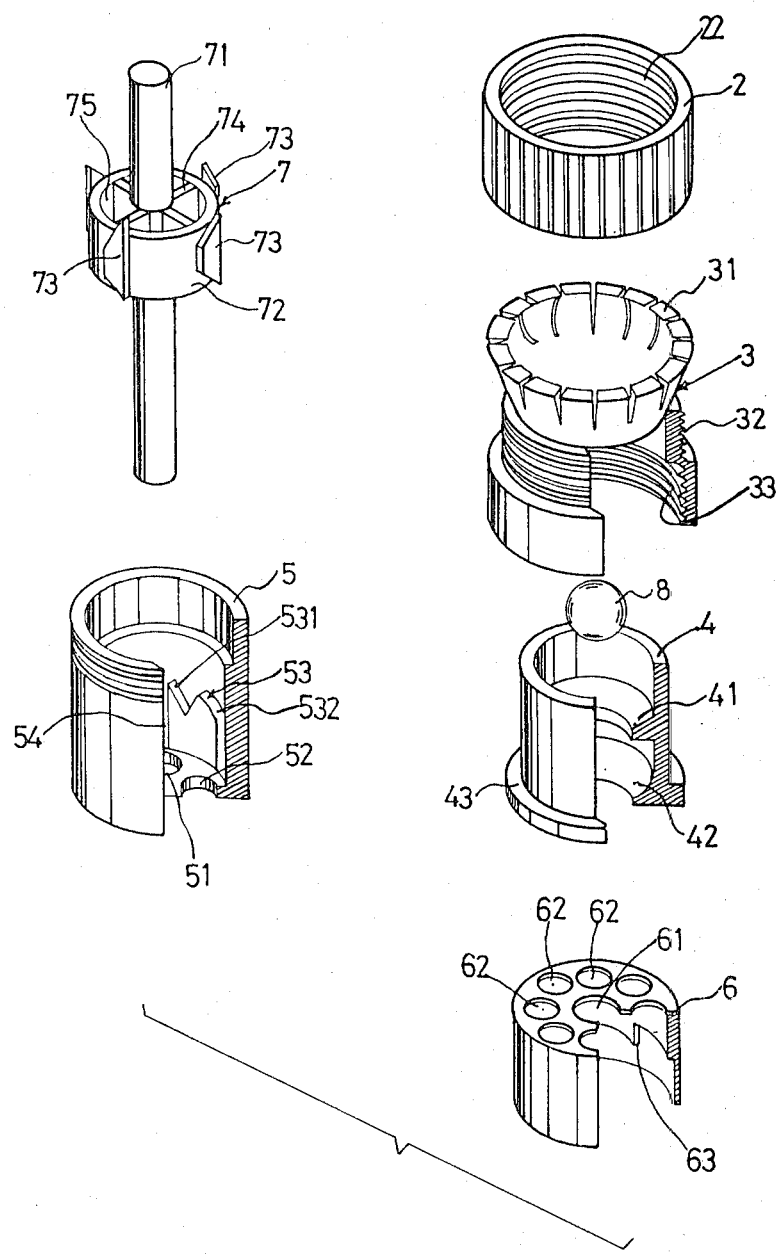
F I G. 2

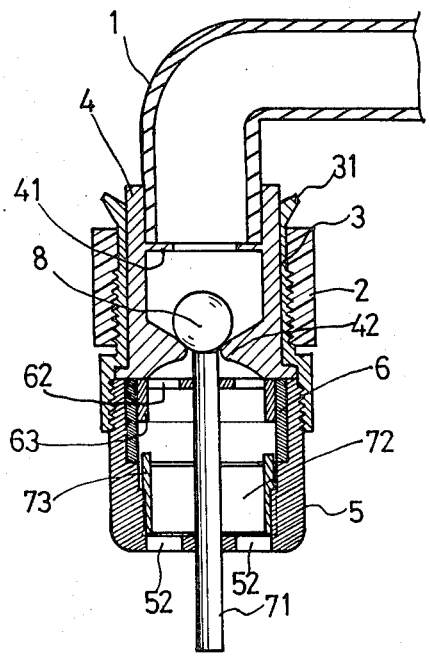
F I G. 3
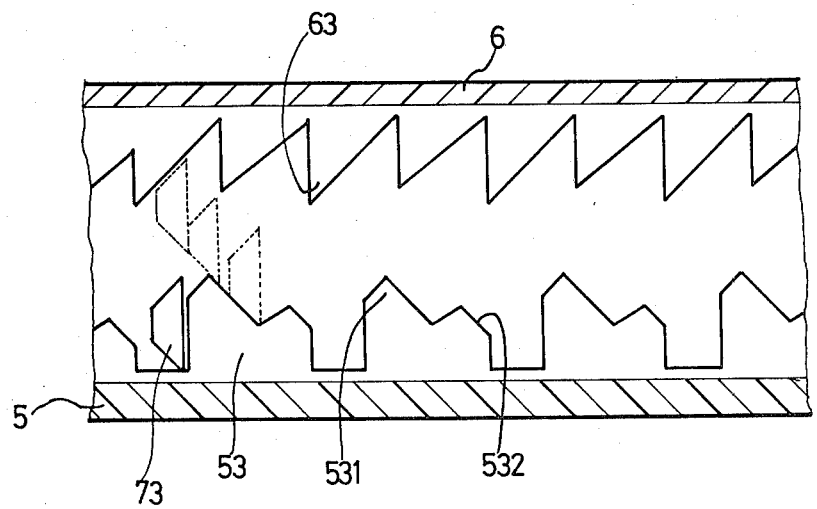
F I G. 4

MECHANISM FOR WATER VALVE

BACKGROUND OF THE INVENTION

This invention relates to a water faucet and particularly to a water faucet which utilizes natural gravity in its operation.

Water faucet is one of the most common housewares in daily life. It is turned on and off to control the water flow for many purposes, such as washing hands, daily house utensils, food, . . . etc. In using conventional water faucets, most of them are required to be operated by hand. In this case, it usually happens that in washing hands, the handle of the water faucet is turned on by dirty hands and turned off by clean hands. Because before washing, most of the hands are unclean, therefore, the dirt will adhere to the handle when turning on the faucet. After the hands have been cleaned by water, the the handle of the faucet has to be turned off by hand. The dirt on the handle will as a result be deposited on the hands so as to render them unclean.

Many years ago, there appeared a kind of water faucet which was designed to have an operating lever which was pushed upward for controlling water flow. A spring was used to drive the operating lever and a washer on the lever usually is employed to stop the water outflow. If the operating lever was pushed upward, its washer would be moved away from the water outlet and allow the water to flow out. Such flow did not stop till the external force was released from the operating lever. Although the said water faucet can eliminate the disadvantages arising from the conventional ones, it is still inconvenient due to the fact that a hand must keep applying force to the operating lever for continued water flow.

Furthermore, as conventional water faucets are operated by turning the handle, their washers can be easily deformed. Deformation or other damages due to bearing external forces greatly shorten their service life.

SUMMARY OF THE INVENTION

It is an object of the present invention to provide a new mechanism for water faucets, in which an operating lever is used to control its operation. When the operating lever is pushed upward, the water valve will be turned on and kept in such condition. To stop the water flowing, push upward the operating lever once more, it will then revert to the condition of turning the water faucet off. Unlike conventional water faucets which requires applying force to push the operating lever upward for water service, the operating lever of the present invention can be kept in the on position, so it facilitates the operation.

As the operating lever, which is pushed upward by an external force when the faucet is in use, is always being flushed, it is kept clean, thus preventing our cleansed hands from any contamination again. This is the second object of the present invention.

The water faucet of the present invention is composed of very simple parts and all of which will not be deformed or damaged by the action of external forces, so that its service life will be prolonged. This is the third object of the present invention.

The water faucet of the present invention can be installed onto conventional ones so that it is not necessary to turn them frequently but still possesses the functions of easy and sanitary operation. And this is the fourth object of the present invention.

A more complete understanding of these and other features and advantages of the present invention will become apparent from a careful consideration of the following detailed description of certain embodiments illustrated in the accompanying drawings.

BRIEF DESCRIPTION OF THE DRAWING

FIG. 2 shows the individual parts of the present invention.

FIG. 3 is a longitudinal cross sectional view of the whole embodiment of the present invention.

FIG. 4 is a partial development diagram, showing how the operating lever of the present invention is operated.

DESCRIPTION OF THE PREFERRED EMBODIMENT

Figure 1A:
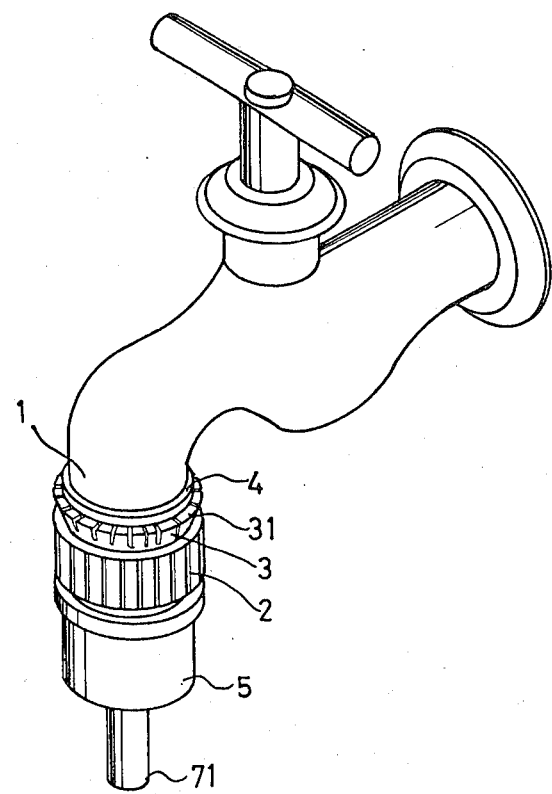
FIG. 1A and FIG. 1B are two practical examples of the present invention.
Figure 1B:
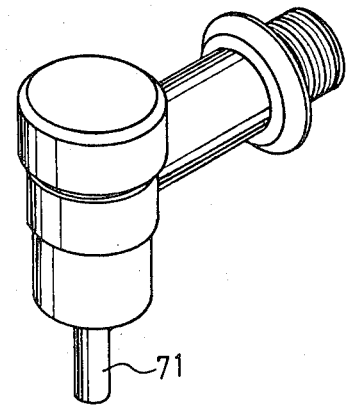

Referring to FIGS. 1A and 1B, the water faucet of the present invention can be connected to a water supply pipe to control the water flow (FIG. 1B). As FIG. 1A shows, it can also be attached to the outlet of a conventional water faucet.

As shown in FIGS. 2 and 3, the present invention is connected to the water supply pipe 1 by means of a soft and elastic sleeve 4. On the inner wall of the sleeve 4, there are a pair of separated flanged rings 41, 42. The base of the sleeve 4 becomes an outward flange 43, wherein, the top surface of the lower flanged ring 42 slopes toward the center of the sleeve 4. A ball 8 is placed between the flanged rings 41 and 42. Sleeve 4 is first put into a threaded clamping tube 3, of which the upper section is shaped into a claw tube 31 with top end larger than the lower one. On the lower section of the claw tube 31 there are screw threads 32. The inner diameter of the lower section of the clamping tube 3 is made larger and threads 33 are formed on its inner wall. Outside the clamping tube 3, a retainer 2 having threads 22 on its inner wall is placed. When attaching the present invention to pipe 1, the sleeve 4 is set into the clamping tube 3, and the retainer 2 on the clamping tube 3 is turned to squeeze the claw tube 31 of the clamping tube 3, so that its claws are closed thus causing the sleeve 4 to be connected to the water supply pipe 1.

Referring to FIGS. 2 and 3 again, below the soft elastic sleeve 4 there is provided covering block 6, which has a shaft hole 61 at the center of its top surface and water inlet 62 around the shaft hole 61. On the inner wall of the cover block 6, there are a number of continuous sharp guide teeth 63 and the top surface of the sharp guide teeth 63 is inclined in arc form. In the cover block 6 is an operating lever set 7 which comprises an operating lever 71, and a rotating tube 72 connected to about the intermediate section of the operating lever 71. Between the inner wall of the rotating tube 72 and the operating lever 71 there are supporting plates 74 which are made to have a number of water outlets 75 inside the rotating tube 72; and on the outer wall of the rotating tube 72 several inserting blocks 73 are provided, each of the inserting blocks 73 being made to have both the upper and lower sides inclined so that it can enter into the arc-like inclined top surface of the guide tooth 63 at the inner wall of the cover block 6.

Referring to FIGS. 2 and 3 once again, the cover block 6 is fixed by a drain pipe 5 which is screwed into the lower section of the clamping tube 3. Drain pipe 5 has an upper inner diameter larger than the lower one and its shoulder presses against the lower end of the cover block 6. At the bottom of this drain pipe 5 are a shaft hole 51 allowing the operating lever 71 to protrude out and several drain ports 52 surrounding the shaft hole 51. On the inner wall of the drain pipe 5, there are further formed a number of positioning teeth 53 each of which has a sharp tooth 531 and a flat tooth 532 connected to each other and between every two adjacent positioning teeth 53 is a groove 54. When the drain pipe 5 is screwed into the clamping tube 3 tightly, each pair of guide teeth 63 on the inner wall of the cover block 6 have their tips engaged with the inclined surface of the sharp tooth 531 and the groove 54 beside the flat tooth 532 respectively (as shown in FIG. 4).

Figures 5, 6:
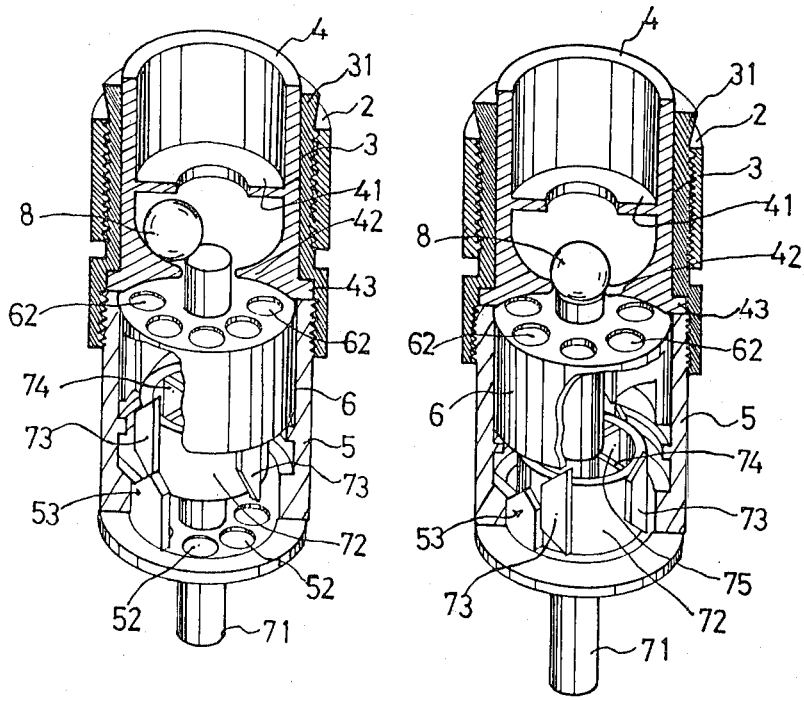
FIG. 5 is an oblique longitudinal sectional view, referring to the practical example when the present invention is in a normally closed condition.
FIG. 6 is a longitudinal sectional view, referring to the condition when the present invention is in use.

How the water faucet of the present invention operates will be described as follows with reference to FIGS. 2, 4, 5 and 6. When the operating lever 71 is in the closed position, the inserting blocks 73 on the rotating tube 72 will enter into the groove 54 between every two adjacent positioning teeth 53 on the inner wall of the drain pipe 5 (as shown in FIG. 4, position A). The operating lever 71 is at the lower position, and its top end does not press against the ball 8, which due to its weight and the force of the water flow, will block the water outlet of the sleeve 4 (as shown in FIG. 5). When the lower end of the operating lever 71 is pushed upward, each of the top surface of the inserting block 73 formed on the rotating tube 72 will press against the inclined surface of the guide tooth 63 on cover block 6 (as shown in FIG. 4, position B). As the guide tooth 63 is in arc form, the inserting block 73 will rotate a certain angle as soon as it slides along the inclined surface of the guide tooth 63. At this moment, release of the external force by means of the gravity and pressure of the water, inserting block 73 will stay at the lower end and against the upper position of the positioning tooth 53 (as shown in FIG. 4, position C). In the meantime, the upper end of the operating lever 71 pushes the ball 8 away, as shown in FIG. 6. Ball 8 does not block the water outlet of the sleeve 4 any more, so that the water can flow out of the drain pipe 5. As a result, when pushing the lower end of the operating lever 71 upward once more, the inserting block 73 will enter into the groove 54 between two positioning teeth 53 on the inner wall of the drain pipe 5, thus revert to the original condition to block the water outlet.

With reference to the water valve of the present invention, its functions are very simple and it is designed to have the operating lever located at the lower side. In this case, the operating lever is always being flushed when the faucet is in use, so the users do not have to worry about the presence of unclean matters attached to the faucet, thus improving our health. Furthermore, as the present invention utilizes the movement of the ball to control water flow, no deformation or damage is incurred to the valve, thus prolonging its service and making it an invention of practicability.

Having described the invention in its preferred embodiment, it is clear that numerous modifications and changes within the ability of those skilled in the art without the exercise of the invention faculty can be made without departing from the spirit and disclosed concepts of the present invention as particularly pointed out and defined in the appended claims.

I claim:

1. A water faucet adapted to be connected to a water supply pipe comprising:
    a soft elastic sleeve having on the inner wall thereof an upper flanged ring and a lower flanged ring having a slanted top surface toward the center to define a valve seat;
    a ball placed within the sleeve for removable blocking the valve seat;
    a clamping tube comprising an upper section shaped into a claw tube having a top end larger than the lower end, a mid-section threaded on the interior surface and a lower section threaded on the interior surface;
    a retaining ring having threads on the interior surface to engage those on the mid-section of the clamping tube;
    a drain pipe having threads on the exterior surface of the upper end thereof to engage those provided on the interior surface of the lower section of the clamping tube and having a plurality of guide teeth and slots provided on the interior surface on the lower end thereof;
    a cover block disposed within the drain pipe and below the sleeve and comprising a hollow cylinder having the upper end thereof covered by a plate having a central opening surrounded by a plurality of openings and an open lower end, the interior surface of the cover block being provided with a plurality of depressions;
    an operating lever comprising a cylinder having the upper end thereof protruding through the central hole in the cover block and the lower end extending out the drain pipe, a rotating tube being attached to an intermediate section of the cylinder, the rotating tube having blocks circumferentially attached so that when the operating lever is raised and then lowered, the blocks on the rotating tube are guided by the depressions on the cover block and the guide teeth on the drain pipe to maintain the operating lever in consecutive raised and lowered positions to move the ball away from the valve seat in the sleeve and permit the ball to block the valve seat, respectively, thus opening and closing the faucet.

2. The faucet of claim 1 wherein the base of the sleeve is formed into an outward flange over which the enlarged lower section of the clamping tube rests.

3. The faucet of claim 1 wherein the lower end of the drain pipe is provided with a plate having a central hole through which the lower end of the operating lever extends, the central hole being surrounded by a plurality of openings.

4. The faucet of claim 1 wherein the blocks on the rotating tube are in the form of vertically disposed trapezoids.

5. The faucet of claim 4 wherein the guide teeth on the drain pipe comprise inclined sharp tooth and flat tooth and the depressions on the cover block comprise a series of guide projections inclined in arc form, the guide teeth and depression being so aligned that when the operating lever is raised, the blocks are guided into the area defined by the sharp tooth and flat tooth in the drain pipe so that the lever is maintained in a raised position thus opening the faucet and when the operating lever is again raised and released, the blocks are guided into the slots in the drain pipe to lower the lever, thus closing the faucet.

* * * * *